United States Patent
Bong et al.

(10) Patent No.: US 11,788,447 B2
(45) Date of Patent: Oct. 17, 2023

(54) METHOD AND DEVICE FOR WARNING OF INSUFFICIENT ENGINE OIL FOR A VEHICLE

(71) Applicants: HYUNDAI MOTOR COMPANY, Seoul (KR); KIA CORPORATION, Seoul (KR)

(72) Inventors: Ha Dong Bong, Gwangmyeong-si (KR); Woong Kim, Hwaseong-si (KR); NamHun Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/853,554

(22) Filed: Jun. 29, 2022

(65) Prior Publication Data
US 2023/0175421 A1     Jun. 8, 2023

(30) Foreign Application Priority Data

Dec. 3, 2021    (KR) ........................ 10-2021-0171895

(51) Int. Cl.
*F01M 11/12*     (2006.01)

(52) U.S. Cl.
CPC ......... *F01M 11/12* (2013.01); *F01M 2250/64* (2013.01); *F01M 2250/66* (2013.01)

(58) Field of Classification Search
CPC .............. F01M 11/12; F01M 2250/64; F01M 2250/66; Y02T 10/12
See application file for complete search history.

(56) References Cited

FOREIGN PATENT DOCUMENTS

| KR | 20090118734 A | * | 11/2009 |
|---|---|---|---|
| KR | 20090118734 A |   | 11/2009 |

\* cited by examiner

*Primary Examiner* — Jacob M Amick
*Assistant Examiner* — Charles J Brauch
(74) *Attorney, Agent, or Firm* — LEMPIA SUMMERFIELD KATZ LLC

(57) ABSTRACT

A method for warning of insufficient engine oil for a vehicle includes: determining, by a controller, whether conditions for determining that the vehicle has insufficient engine oil are satisfied, after an engine of the vehicle is started; determining, by the controller, whether an integrated value obtained by integrating a difference between a target operating value and an actual operating value of a hydraulic continuously variable valve timing (CVVT) device included in the engine within an operating time period of the hydraulic CVVT device is equal to or greater than a reference difference value, when the conditions for determining whether the vehicle has insufficient engine oil are satisfied; and determining, by the controller, that the vehicle has insufficient engine oil based on counting information on the number of times the integrated value, obtained by integrating the difference between the target operating value and the actual operating value, is equal to or greater than the reference difference value.

15 Claims, 2 Drawing Sheets

METHOD AND DEVICE FOR WARNING OF INSUFFICIENT ENGINE OIL FOR A VEHICLE

CROSS-REFERENCE TO RELATED APPLICATION

This application claims priority to and the benefit of Korean Patent Application No. 10-2021-0171895 filed in the Korean Intellectual Property Office on Dec. 3, 2021, the entire contents of which are incorporated herein by reference.

BACKGROUND OF THE DISCLOSURE

(a) Technical Field

The present disclosure relates to a vehicle. More particularly, the present disclosure relates to a method and a device for warning of insufficient engine oil for a vehicle.

(b) Description of the Related Art

In a vehicle, engine oil acts as a lubricant for reducing frictional resistance by forming a thin film on a portion where frictional resistance occurs, such as a sliding portion between a piston and an engine cylinder or a rotating portion between a crankshaft and a bearing. Further portions where frictional resistance occurs may be an airtight sealer for sealing a gap between a piston ring and the cylinder, a cooler for absorbing heat from the cylinder and the piston, a corrosion inhibitor, or a cleaner for absorbing metal powder generated from the sliding or rotating portion such that the engine oil into which the metal powder is absorbed is filtered through an oil filter.

When an amount of oil injected into an engine is insufficient, oil pressure decreases. Thus, the engine may be equipped with an oil pressure sensor to detect oil pressure and determine whether the amount of oil is insufficient based on the detected oil pressure. The engine may also or instead be equipped with an oil level sensor to detect the oil level and determine whether the amount of oil is insufficient based on the detected oil level.

When it is determined, using the oil pressure sensor, that the amount of oil is insufficient, an oil warning lamp included in a cluster of the vehicle is turned on so that a driver of the vehicle is notified to replenish the oil. In a vehicle equipped with an oil level sensor, when it is determined that the oil level decreases, an oil warning lamp is turned on to induce a driver to replenish oil.

However, as the high-price oil pressure sensor or the high-price oil level sensor is installed in the vehicle, the cost of the vehicle may increase.

In a vehicle that includes an oil pressure switch, when an engine oil pressure decreases to a reference value or lower, an oil pressure switch is turned on, and an oil warning lamp included in a cluster of the vehicle is turned on. However, when the vehicle moves, if oil in an oil pan flows up to an oil strainer, the oil pressure switch is turned off, and the oil warning lamp is turned off. Therefore, a driver of the vehicle may not recognize that the engine oil is insufficient until an oil level is very low and the oil warning lamp is turned on at all times, resulting in damage to the engine.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to provide methods and devices for warning of insufficient engine oil for a vehicle having the advantages of using a hydraulic continuously variable valve timing (CVVT) device to warn of the insufficient engine oil for the vehicle.

An embodiment of the present disclosure provides a method for warning of insufficient engine oil for a vehicle. The method includes determining, by a controller, whether conditions for determining that the vehicle has insufficient engine oil are satisfied, after an engine of the vehicle is started. The method further includes determining, by the controller, whether an integrated value, obtained by integrating a difference between a target operating value and an actual operating value of a hydraulic continuously variable valve timing (CVVT) device included in the engine within an operating time period of the hydraulic CVVT device, is equal to or greater than a reference difference value, when the conditions for determining that the vehicle has insufficient engine oil are satisfied. Furthermore, the method includes determining, by the controller, that the vehicle has insufficient engine oil based on counting information on the number of times the integrated value, obtained by integrating the difference between the target operating value and the actual operating value, is equal to or greater than the reference difference value.

The conditions for determining whether the vehicle has insufficient engine oil may include a condition that a revolutions per minute (RPM) of the engine for operating the hydraulic CVVT device is equal to or greater than a first reference RPM. The conditions may further include a condition that an absolute value of a speed change value of the vehicle over time is equal to or greater than a reference acceleration value.

The conditions for determining whether the vehicle has insufficient engine oil may include a condition that an RPM of the engine for operating the hydraulic CVVT device is equal to or greater than a first reference RPM. The conditions may further include a condition that a rotation angle of a steering wheel of the vehicle is equal to or greater than a reference rotation angle and may include a condition that a speed of the vehicle is equal to or greater than a reference speed.

The determining that the vehicle has insufficient engine oil may include increasing, by the controller, a count value of an error counter storing counting information on the number of times the integrated value, obtained by integrating the difference between the target operating value and the actual operating value, is equal to or greater than the reference difference value. The determining may further include determining, by the controller, that the vehicle has insufficient engine oil when the increased count value of the error counter becomes a reference count value.

The method for warning of insufficient engine oil for the vehicle may further include turning on, by the controller, a lamp for warning the insufficient engine oil, when it is determined that the vehicle has insufficient engine oil.

The determining that the vehicle has insufficient engine oil may further include decreasing, by the controller, the RPM of the engine to a second reference RPM, when it is determined that the vehicle has insufficient engine oil.

Another embodiment of the present disclosure provides a device for warning of insufficient engine oil for a vehicle. The device includes a hydraulic continuously variable valve timing (CVVT) device included in an engine of the vehicle. The device further includes a controller determining whether conditions for determining that the vehicle has insufficient engine oil are satisfied, after the engine is started. When the conditions for determining that the vehicle has insufficient engine oil are satisfied, the controller determines whether an integrated value, obtained by integrating a difference between a target operating value and an actual operating value of the hydraulic CVVT device within an operating time period of the hydraulic CVVT device, is equal to or greater than a reference difference value. The controller further determines that the vehicle has insufficient engine oil based on counting information on the number of times the integrated value, obtained by integrating the difference between the target operating value and the actual operating value, is equal to or greater than the reference difference value.

The conditions for determining whether the vehicle has insufficient engine oil may include a condition that an RPM of the engine for operating the hydraulic CVVT device is equal to or greater than a first reference RPM. The conditions may further include a condition that an absolute value of a speed change value of the vehicle over time is equal to or greater than a reference acceleration value.

The conditions for determining whether the vehicle has insufficient engine oil may include a condition that an RPM of the engine for operating the hydraulic CVVT device is equal to or greater than a first reference engine RPM. The conditions may further include a condition that a rotation angle of a steering wheel of the vehicle is equal to or greater than a reference rotation angle and may include a condition that a speed of the vehicle is equal to or greater than a reference speed.

The controller may increase a count value of an error counter storing counting information on the number of times the integrated value, obtained by integrating the difference between the target operating value and the actual operating value, is equal to or greater than the reference difference value. When the increased count value of the error counter becomes a reference count value, the controller may determine that the vehicle has insufficient engine oil.

When it is determined that the vehicle has insufficient engine oil, the controller may turn on a lamp to warn of the insufficient engine oil.

When it is determined that the vehicle has insufficient engine oil, the controller may decrease the RPM of the engine to a second reference RPM.

Yet another embodiment of the present disclosure provides a method for warning of insufficient engine oil for a vehicle. The method includes determining, by a controller, whether conditions for determining that the vehicle has insufficient engine oil are satisfied, after an engine of the vehicle is started. The method further includes determining, by the controller, whether a difference value between a target operating value and an actual operating value of a hydraulic continuously variable valve timing (CVVT) device included in the engine within an operating time period of the hydraulic CVVT device is equal to or greater than a reference difference value, when the conditions for determining that the vehicle has insufficient engine oil are satisfied. Furthermore, the method includes determining, by the controller, that the vehicle has insufficient engine oil based on counting information on the number of times the difference value between the target operating value and the actual operating value is equal to or greater than the reference difference value.

The conditions for determining whether the vehicle has insufficient engine oil may include a condition that an RPM of the engine for operating the hydraulic CVVT device is equal to or greater than a first reference RPM. The conditions may further include a condition that an absolute value of a speed change value of the vehicle over time is equal to or greater than a reference acceleration value.

The conditions for determining whether the vehicle has insufficient engine oil may include a condition that an RPM of the engine for operating the hydraulic CVVT device is equal to or greater than a first reference RPM. The conditions may further include a condition that a rotation angle of a steering wheel of the vehicle is equal to or greater than a reference rotation angle and may include a condition that a speed of the vehicle is equal to or greater than a reference speed.

The devices and methods for warning of insufficient engine oil for a vehicle, according to the above-described embodiments of the present disclosure, are capable of quickly detecting an insufficient state of engine oil in the vehicle and warning a driver of the vehicle of the insufficient state of the engine oil. The devices and methods use the acceleration or deceleration speed of the vehicle and the hydraulic CVVT device or use the turning angle (rotating angle) of the vehicle and the hydraulic CVVT device and decrease the RPM of the engine in the vehicle to a reference RPM when the engine oil is insufficient so that the vehicle travels in a safe state.

BRIEF DESCRIPTION OF THE DRAWINGS

In order for the drawings used in the detailed description of the present disclosure to be sufficiently understood, a brief description of each drawing is provided below.

DETAILED DESCRIPTION OF THE EMBODIMENTS

Figure 1:
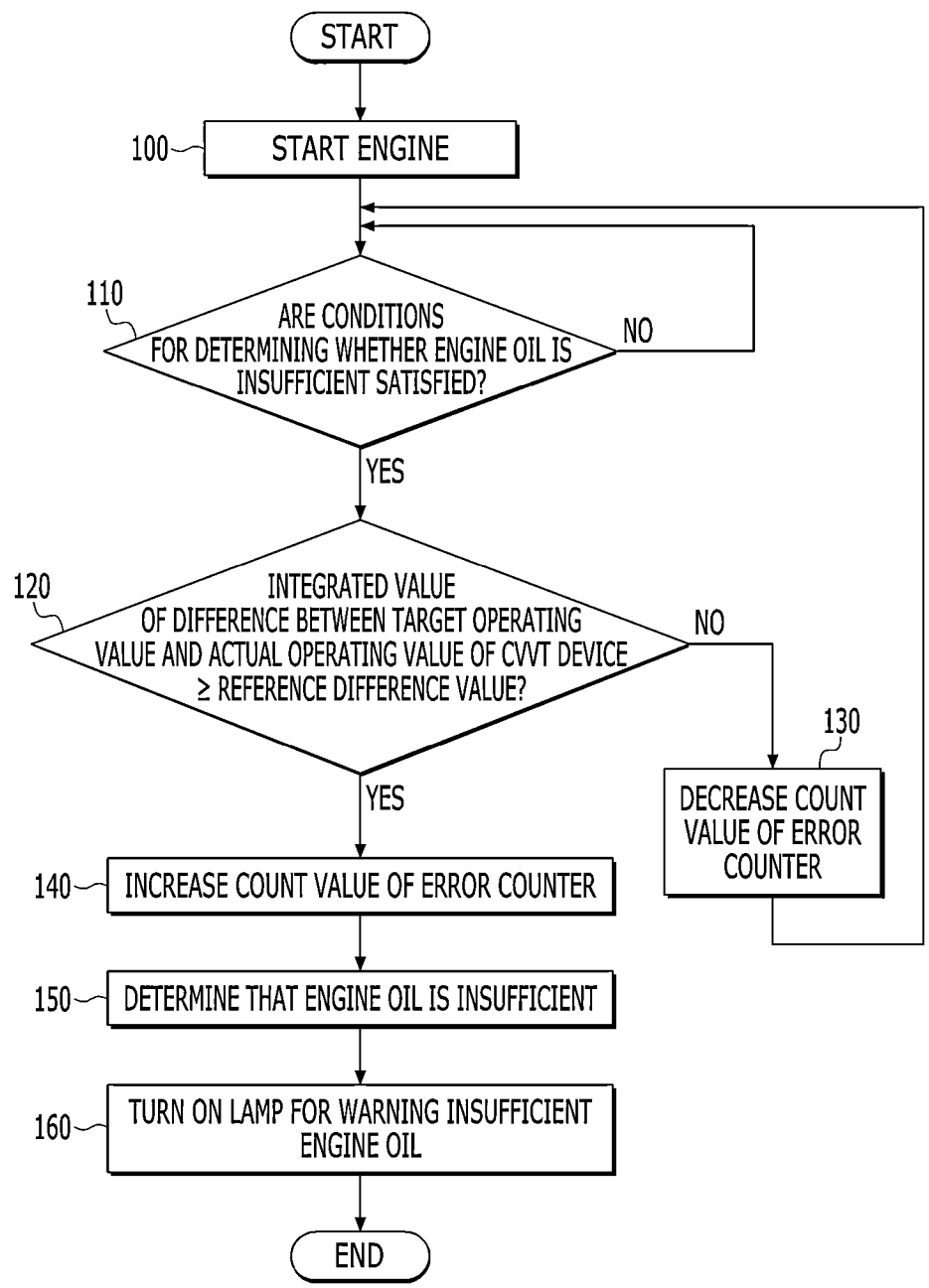
FIG. 1 is a flowchart illustrating a method for warning of insufficient engine oil for a vehicle according to an embodiment of the present disclosure.

In order to sufficiently understand the present disclosure and the objects achieved by the inventive concept of the present disclosure, reference should be made to the accompanying drawings illustrating embodiments of the present disclosure and contents described in the accompanying drawings.

Hereinafter, the inventive concept is described in detail by describing embodiments of the present disclosure with reference to the accompanying drawings. In describing the embodiments, when it is determined that a detailed description of a related known configuration or function may obscure the gist of the present disclosure, the detailed description thereof has been omitted. Throughout the drawings, the same reference numerals denote the same components.

Terms used herein are used only to describe specific embodiments and are not intended to limit the present disclosure. Singular forms include plural forms unless the context clearly indicates otherwise. It should also be understood that the terms "include," "have," and the like used herein specify the presence of features, numerals, steps, operations, components, parts, or combinations thereof described herein. Such terms do not preclude the presence or addition of one or more other features, numerals, steps, operations, components, parts, or combinations thereof.

Throughout the specification, when one portion is referred to as being "connected to" another portion, this means that one portion is "directly connected to" another portion, or one portion is "electrically or mechanically connected to" another portion with another component interposed therebetween. When a component, device, element, or the like of the present disclosure is described as having a purpose or performing an operation, function, or the like, the component, device, or element should be considered herein as being "configured to" meet that purpose or to perform that operation or function.

Unless defined otherwise, the terms used herein, including technical or scientific terms, have the same meanings as commonly understood by a person having ordinary knowledge in the art to which the present disclosure pertains (a person having ordinary skill in the art). It should be noted that terms defined by generally-used dictionaries are interpreted as having meanings in the context of the related art. The terms are not interpreted as having ideal or excessively formal meanings unless explicitly defined herein.

Figure 2:
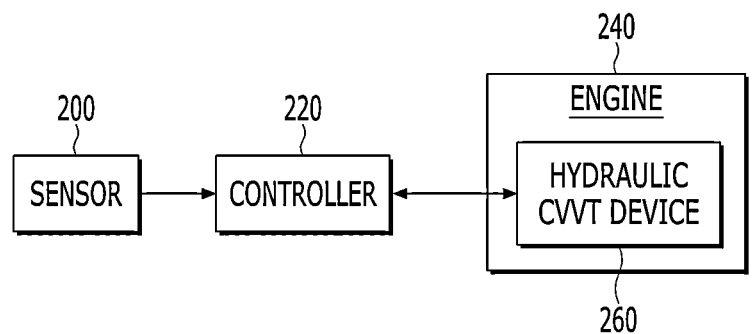
FIG. 2 is a block diagram illustrating a device for warning of insufficient engine oil for a vehicle to which the method for warning of insufficient engine oil for the vehicle illustrated in FIG. 1 is applied.

FIG. 1 is a flowchart illustrating a method for warning of insufficient engine oil for a vehicle according to an embodiment of the present disclosure. FIG. 2 is a block diagram illustrating a device for warning of insufficient engine oil for a vehicle to which the method for warning of insufficient engine oil for the vehicle illustrated in FIG. 1 is applied.

Referring to FIGS. 1 and 2, in a starting step 100, a controller 220 may start an engine 240 of the vehicle in response to a start signal from a driver of the vehicle.

The controller 220 is an electronic control unit (ECU) and may control an overall operation of the vehicle, including the device for warning of insufficient engine oil for the vehicle. The controller 220 may be, for example, at least one microprocessor operated by a program (control logic) or hardware (e.g., microcomputer), including the microprocessor. The program may include a series of instructions for executing the method for warning of insufficient engine oil for the vehicle according to an embodiment of the present disclosure. The instructions may be stored in a memory of the device for warning of insufficient engine oil for the vehicle or may be stored in the controller 220.

The device for warning of insufficient engine oil for the vehicle may include sensors (or data detectors) 200, a controller 220, and an engine 240. The engine 240 includes a hydraulic continuously variable valve timing (CVVT) device 260. The hydraulic CVVT device 260 may regulate the opening and closing timing of intake and exhaust valves of the engine by changing engine oil supply channels (engine oil supply paths) using oil control valves. The hydraulic CVVT device 260 may improve the fuel efficiency of the vehicle.

According to step 110 illustrated in FIG. 1, after step 100, the controller 220 may determine whether conditions for determining that the vehicle has insufficient engine oil are satisfied. The conditions for determining that the vehicle has insufficient engine oil may include a condition that a revolutions per minute (RPM) of the engine 240 for operating the hydraulic CVVT device 260 is equal to or greater than a first reference RPM. The conditions may further include a condition that an absolute value of a speed change value of the vehicle over time is equal to or greater than a reference acceleration value (e.g., a condition in which the vehicle is rapidly accelerated or decelerated).

The conditions may be conditions for determining whether the vehicle has either accelerated or decelerated to cause concentration of engine oil. For example, the controller 220 may calculate a speed change value of the vehicle using a brake signal (brake pedal signal) of the vehicle and a vehicle speed signal generated from a wheel or a transmission of the vehicle. The first reference RPM and the reference acceleration value may be determined by tests (or experiments). In another embodiment of the present disclosure, the conditions may include a condition that the fuel supply to the engine 240 is cut off.

In another embodiment of the present disclosure, the conditions for determining whether the vehicle has insufficient engine oil may include a condition that an RPM of the engine 240 for operating the hydraulic CVVT device 260 is equal to or greater than a first reference RPM. The conditions may further include a condition that a rotation angle of a steering wheel (handle) of the vehicle is equal to or greater than a reference rotation angle and may include a condition that a speed of the vehicle is equal to or greater than a reference speed. The conditions may be conditions for determining whether the vehicle has turned (rotated) to cause concentration of engine oil. For example, the controller 220 may detect (sense) that the vehicle is rotated or turned using a rotation angle signal of the steering wheel of the vehicle. The reference rotation angle and the reference speed may be determined by tests (or experiments). When a rotation radius of the vehicle increases, the speed of the vehicle may increase.

The sensors 200 in the device for warning of insufficient engine oil for the vehicle may include an engine RPM sensor detecting an RPM of the engine 240 and providing the detected RPM of the engine 240 to the controller 220. The sensors 200 may further include a speed sensor detecting a speed of the vehicle and providing the detected speed of the vehicle to the controller 220. The sensors 220 may also include a fuel cut-off sensor detecting that the fuel supply to the engine 240 is cut off and providing the detected information to the controller 220. The sensors 200 may also include a sensor detecting an operating value of the hydraulic CVVT device 260 and providing the detected operating value of the hydraulic CVVT device 260 to the controller 220. The sensors 200 may further include a steering wheel rotation angle detection sensor detecting a rotation angle of the steering wheel of the vehicle and providing the detected rotation angle of the steering wheel of the vehicle to the controller 220. When the vehicle accelerates or decelerates or when the vehicle turns, concentration or tilting of the engine oil may occur. Accordingly, the engine oil pressure for operating the hydraulic CVVT device 260 may decrease.

When the conditions for determining whether the vehicle has insufficient engine oil are satisfied, the method for warning of insufficient engine oil for the vehicle, which is a process, may proceed to step 120.

According to step 120, the controller 220 may determine whether an integrated value is equal to or greater than a first reference difference value. The integrated value may be obtained by integrating (calculating by integration with respect to time) a difference between a target operating value and an actual operating value of the hydraulic CVVT device within an operating time period of the hydraulic CVVT device 260. In another embodiment of the present disclosure, the controller 220 may determine whether a difference value between a target operating value and an actual operating value of the hydraulic CVVT device within an operating time period of the hydraulic CVVT device 260 is equal to or greater than a second reference difference value. The first reference difference value and the second reference difference value for warning of insufficient engine oil for the vehicle may be determined by tests (or experiments). The first reference difference value and the second reference difference value may vary depending on a shape of an oil pan of the vehicle that supplies and stores the engine oil or on a location of an oil strainer that is an engine oil intake port and is installed inside the oil pan.

The method for warning of insufficient engine oil for the vehicle, which is a process, may proceed to step 130 when the integrated value, obtained by integrating the difference between the target operating value and the actual operating value, is smaller than the first reference difference value. Alternatively, the method may proceed to step 130 when the difference value between the target operating value and the actual operating value is smaller than the second reference difference value. On the other hand, the method for warning of insufficient engine oil for the vehicle, may proceed to step 140 when the integrated value, obtained by integrating the difference between the target operating value and the actual operating value, is equal to or greater than the first reference difference value. Alternatively, the method may proceed to step 140 when the difference value between the target operating value and the actual operating value is equal to or greater than the second reference difference value.

According to step 130, the controller 220 may decrease a count value of an error counter storing counting information based on the number of times the integrated value, obtained by integrating the difference between the target operating value and the actual operating value, is smaller than the first reference difference value (or when the difference value between the target operating value and the actual operating value is smaller than the second reference difference value). Then, the method for warning of insufficient engine oil of the vehicle, which is a process, may proceed back to the step 110.

According to step 140, the controller 220 may increase a count value of an error counter storing counting information based on the number of times the integrated value, obtained by integrating the difference between the target operating value and the actual operating value, is equal to or greater than the first reference difference value (or when the difference value between the target operating value and the actual operating value is equal to or greater than the second reference difference value). Then, the method for warning of insufficient engine oil of the vehicle, which is a process, may proceed to the step 150.

According to step 150, when the increased count value of the error counter becomes a reference count value, the controller 220 may determine that the vehicle has insufficient engine oil. The reference count value for warning of insufficient engine oil for the vehicle may be determined by tests (or experiments). The reference count value may vary depending on the shape of the oil pan of the vehicle supplying the engine oil or on a location of an oil strainer that is an engine oil intake port and is installed inside the oil pan.

According to step 160, after step 150, the controller 220 may warn the driver of the vehicle by turning on a lamp for warning of insufficient engine oil. The lamp may be included in the device for warning of insufficient engine oil for the vehicle. In another embodiment of the present disclosure, after step 150, the controller 220 may decrease (limit) an RPM of the engine 240 to a value equal to or smaller than a second reference RPM to prevent an engine failure (e.g., damage to a connecting rod bearing that is an engine bearing). The second reference RPM may be determined by tests (or experiments).

As described above, concentration of engine oil may occur when the vehicle accelerates or decelerates, or when the vehicle turns. As a result, the engine oil may not be supplied to the oil strainer, thereby decreasing a flow rate of the engine oil for operating the hydraulic CVVT device 260. In an embodiment of the present disclosure, the decreased flow rate of the engine oil may be detected to warn the driver that the engine oil is insufficient.

A component, "unit," "group," block, or module used in an embodiment of the present disclosure may be implemented by software, hardware, or a combination of software and hardware. The software may be or include a task, class, sub-routine, process, object, execution thread, or program performed in a predetermined region on a memory. The hardware may be or include a field-programmable gate array (FPGA) or an application-specific integrated circuit (ASIC). The component, "unit," or the like may be included in a computer-readable storage medium, including non-transitory type memory, or may be partially dispersed and distributed in a plurality of computers.

As described above, embodiments have been disclosed in the drawings and the specification. Hereinabove, specific terms have been used, but these specific terms are merely used to describe the embodiments of the present disclosure and are not used to limit the meaning or limit the scope of the present inventive concept described in the claims. Thus, a person having ordinary knowledge in the art should understand that various modifications and equivalent embodiments are possible from the present disclosure. Therefore, the true technical protective scope of the present disclosure should be defined by the technical spirit of the appended claims.

DESCRIPTION OF SYMBOLS

200: sensor
220: controller
240: engine
260: hydraulic CVVT device

What is claimed is:

1. A method for warning of insufficient engine oil for a vehicle, the method comprising:
   determining, by a controller, whether conditions for determining that the vehicle has insufficient engine oil are satisfied, after an engine of the vehicle is started;
   determining, by the controller, whether an integrated value, obtained by integrating a difference between a target operating value and an actual operating value of a hydraulic continuously variable valve timing (CVVT) device included in the engine within an operating time period of the hydraulic CVVT device, is equal to or greater than a reference difference value, when the conditions for determining whether the vehicle has insufficient engine oil are satisfied; and
   determining, by the controller, that the vehicle has insufficient engine oil based on counting information on a number of times the integrated value, obtained by integrating the difference between the target operating value and the actual operating value, is equal to or greater than the reference difference value.

2. The method of claim 1, wherein
   the conditions for determining whether the vehicle has insufficient engine oil include a condition that a revolutions per minute (RPM) of the engine for operating the hydraulic CVVT device is equal to or greater than a first reference RPM, and a condition that an absolute value of a speed change value of the vehicle over time is equal to or greater than a reference acceleration value.

3. The method of claim 1, wherein
the conditions for determining whether the vehicle has insufficient engine oil include a condition that an RPM of the engine for operating the hydraulic CVVT device is equal to or greater than a first reference RPM, a condition that a rotation angle of a steering wheel of the vehicle is equal to or greater than a reference rotation angle, and a condition that a speed of the vehicle is equal to or greater than a reference speed.

4. The method of claim 1, wherein the determining that the vehicle has insufficient engine oil includes:
increasing, by the controller, a count value of an error counter storing counting information based on the number of times the integrated value, obtained by integrating the difference between the target operating value and the actual operating value, is equal to or greater than the reference difference value; and
determining, by the controller, that the vehicle has insufficient engine oil when the increased count value of the error counter becomes a reference count value.

5. The method of claim 1, further comprising:
turning on, by the controller, a lamp for warning the insufficient engine oil, when it is determined that the vehicle has insufficient engine oil.

6. The method of claim 5, wherein the determining that the vehicle has insufficient engine oil further includes:
decreasing, by the controller, an RPM of the engine to a second reference RPM, when it is determined that the vehicle has insufficient engine oil.

7. A device for warning of insufficient engine oil for a vehicle, the device comprising:
a hydraulic continuously variable valve timing (CVVT) device included in an engine of the vehicle; and
a controller determining whether conditions for determining that the vehicle has insufficient engine oil are satisfied, after the engine is started,
wherein, when the conditions for determining that the vehicle has insufficient engine oil are satisfied, the controller determines whether an integrated value, obtained by integrating a difference between a target operating value and an actual operating value of the hydraulic CVVT device within an operating time period of the hydraulic CVVT device, is equal to or greater than a reference difference value, and
the controller determines that the vehicle has insufficient engine oil based on counting information on a number of times the integrated value, obtained by integrating the difference between the target operating value and the actual operating value, is equal to or greater than the reference difference value.

8. The device of claim 7, wherein
the conditions for determining whether the vehicle has insufficient engine oil include a condition that a revolutions per minute (RPM) of the engine for operating the hydraulic CVVT device is equal to or greater than a first reference RPM, and a condition that an absolute value of a speed change value of the vehicle over time is equal to or greater than a reference acceleration value.

9. The device of claim 7, wherein
the conditions for determining whether the vehicle has insufficient engine oil include a condition that an RPM of the engine for operating the hydraulic CVVT device is equal to or greater than a first reference RPM, a condition that a rotation angle of a steering wheel of the vehicle is equal to or greater than a reference rotation angle, and a condition that a speed of the vehicle is equal to or greater than a reference speed.

10. The device of claim 7, wherein
the controller increases a count value of an error counter storing counting information based on the number of times the integrated value, obtained by integrating the difference between the target operating value and the actual operating value, is equal to or greater than the reference difference value, and
when the increased count value of the error counter becomes a reference count value, the controller determines that the vehicle has insufficient engine oil.

11. The device of claim 7, wherein
when it is determined that the vehicle has insufficient engine oil, the controller turns on a lamp for warning the insufficient engine oil.

12. The device of claim 11, wherein
when it is determined that the vehicle has insufficient engine oil, the controller decreases an RPM of the engine to a second reference RPM.

13. A method for warning of insufficient engine oil for a vehicle, the method comprising:
determining, by a controller, whether conditions for determining that the vehicle has insufficient engine oil are satisfied, after an engine of the vehicle is started;
determining, by the controller, whether a difference value between a target operating value and an actual operating value of a hydraulic continuously variable valve timing (CVVT) device included in the engine within an operating time period of the hydraulic CVVT device is equal to or greater than a reference difference value, when the conditions for determining whether the vehicle has insufficient engine oil are satisfied; and
determining, by the controller, that the vehicle has insufficient engine oil based on counting information on a number of times the difference value between the target operating value and the actual operating value is equal to or greater than the reference difference value.

14. The method of claim 13, wherein
the conditions for determining whether the vehicle has insufficient engine oil include a condition that a revolutions per minute (RPM) of the engine for operating the hydraulic CVVT device is equal to or greater than a first reference RPM, and a condition that an absolute value of a speed change value of the vehicle over time is equal to or greater than a reference acceleration value.

15. The method of claim 13, wherein
the conditions for determining whether the vehicle has insufficient engine oil include a condition that an RPM of the engine for operating the hydraulic CVVT device is equal to or greater than a first reference RPM, a condition that a rotation angle of a steering wheel of the vehicle is equal to or greater than a reference rotation angle, and a condition that a speed of the vehicle is equal to or greater than a reference speed.

* * * * *